(12) United States Patent
Fomperie et al.

(10) Patent No.: US 6,674,009 B2
(45) Date of Patent: Jan. 6, 2004

(54) NANOCOMPOSITE BASED ON A BRIDGED CLAY, AND CABLE COMPRISING SAID COMPOSITE

(75) Inventors: Lionel Fomperie, Auffargis (FR); Pascal Amigouet, Boissy Saint Yon (FR); Faïza Bergaya, St Cyr en Val (FR); Tushar Mandalia, Orleans (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/866,836

(22) Filed: May 30, 2001

(65) Prior Publication Data

US 2002/0010248 A1 Jan. 24, 2002

(30) Foreign Application Priority Data

May 31, 2000 (FR) .............................................. 00 07017

(51) Int. Cl.[7] .................................................. H01B 3/00
(52) U.S. Cl. .................................................. 174/110 R
(58) Field of Search ................. 174/110 R, 110 SR, 174/110 PM, 110 N, 110 AR, 120 R, 120 AR

(56) References Cited

U.S. PATENT DOCUMENTS

| 4,207,377 | A | | 6/1980 | Kindrick |
| 4,889,885 | A | * | 12/1989 | Usuki et al. ................. 523/521 |
| 5,198,512 | A | * | 3/1993 | Jackson et al. ............. 502/155 |
| 5,876,812 | A | * | 3/1999 | Frisk et al. .................. 428/216 |
| 6,084,019 | A | * | 7/2000 | Matayabas et al. ......... 428/333 |
| 6,238,790 | B1 | * | 5/2001 | Smith et al. .......... 174/110 SR |

FOREIGN PATENT DOCUMENTS

| EP | 0 558 881 A2 | 9/1993 |
| WO | WO 92/16322 | 10/1992 |

* cited by examiner

*Primary Examiner*—Chau N. Nguyen
(74) *Attorney, Agent, or Firm*—Sughrue Mion, PLLC

(57) ABSTRACT

Nanocomposites containing a clay and an organic compound, in which the clay is a clay bridged by a metal compound, preferably iron oxide and/or aluminum oxide. The organic compound is preferably a polymer. The clay-based nanocomposites have good mechanical properties and good heat resistance. The invention also provides cables containing such a nanocomposite, preferably in their sheath or outer coating. Finally, the invention provides a process for producing the nanocomposite.

11 Claims, 1 Drawing Sheet

FIG_1
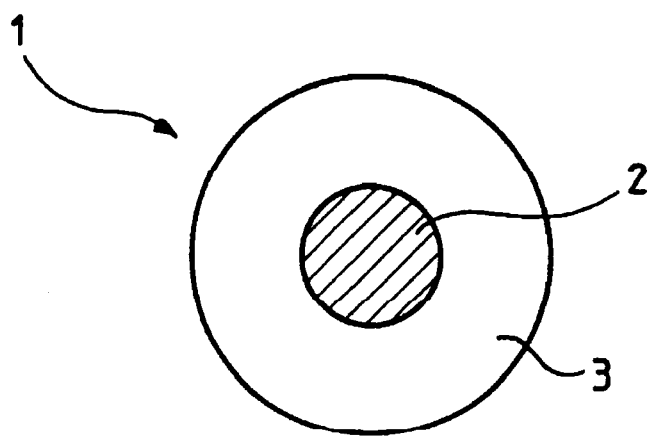
FIG_2
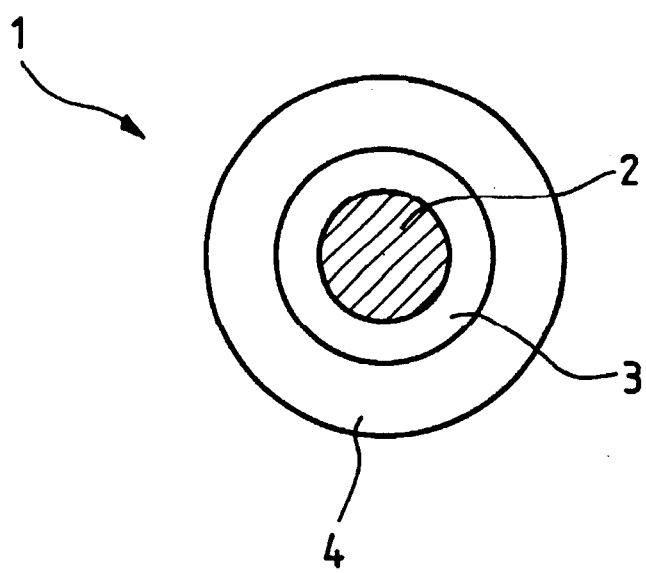

NANOCOMPOSITE BASED ON A BRIDGED CLAY, AND CABLE COMPRISING SAID COMPOSITE

BACKGROUND OF THE INVENTION

The present invention relates to novel chemical compositions comprising bridged clay and organic compounds. These compositions form materials known as nanocomposites, which possess improved mechanical and thermal properties.

Such nanocomposites can advantageously be used, for example, as cable insulation materials. PVC, used until now to sheath and insulate cables, must be replaced because of the toxic and corrosive products that can be released during combustion. However, the currently available non-halogenated fire-resistant materials are both expensive and have low resistance to heat and oil. Thus, a material is sought that is compatible with the environment and that does not have the disadvantages cited above, to replace PVC in insulating parts or in cable sheaths.

A further solution for rendering cable sheaths more fire-resistant is to add a large quantity of metal hydroxides. However, the mechanical and electrical properties of the cables degrade.

Nanocomposites are composite materials comprising submicronic particles dispersed in an organic matrix. In particular, lamellar inorganic materials such as graphite or silicates have the ability to intercalate organic compounds such as polymers between their lamellae. When the repulsive forces between the atoms of the organic compound exceed the attractive forces between the lamellae, the lamellar material delaminates, resulting in a hybrid structure in which the lamellae are dispersed through the organic compound matrix.

However, preparing nanocomposites generally necessitates pre-treating the lamellar material. In order for the organic compound, in general a polymer, to be able to penetrate between the lamellae, the lamellar material preferably presents an organophilic nature, which it generally does not normally possess. In that case, the surface of the inorganic material has to be pre-treated to endow it with that more organophilic nature.

International patent application WO-A-93/04117 describes nanocomposites obtained by treating the lamellar inorganic material with swelling/compatibilizing agents such as primary and secondary amines or quaternary phosphonium cation complexes with residues containing a certain number of aliphatic carbon atoms. Such long carbon chain compounds interact favorably with the intercalating compound. However, it has been shown that the thermal stability of clays treated with quaternary ammonium salts is lower. Further, ammonium salt decomposition can cause decolorization, the formation of gaseous products, and it can degrade mechanical properties.

OBJECTS AND SUMMARY OF THE INVENTION

The invention thus aims to overcome the problem of providing a nanocomposite in which the structure of the lamellar inorganic material has a higher thermal stability.

In the invention, the solution consists of using a clay bridged with a metal compound as the lamellar material. It has been shown that such bridged clays have a particularly stable structure under heat stress. The water present between the layers and bound to the cations initially present in the interlamellar spaces is expelled by the bridging that is produced by a cation exchange mechanism by a metal oxyhydroxycation and which prevents the lamellae from closing up, resulting in a higher permanent mesoporosity. This has the effect of facilitating intercalation of the organic compound and facilitating nanocomposite formation.

Finally, the presence of different metallic species can further improve the thermal stability and fire resistance. These thermal and mechanical properties are combined with a reduced weight due to the small proportion of filler compared with normal compositions. This means that nanocomposites are perfectly suited to protecting and thermally insulating articles where their weight has to be limited, such as cables.

In the invention, the nanocomposite uses a bridged clay with a lamellar structure that, after optional specific prior heat treatment, can intercalate an organic compound between its lamellae.

The nanocomposite of the invention is obtained from a compound bridged with a metal compound and an organic compound, preferably a polymer. The bridged clay acts as a filler and can be obtained by treating a natural or synthetic clay.

Certain of the lamellar clays used are also known as smectites. In the invention, the clay is preferably selected from smectites: montmorillonite, laponite, beidellite, nontronite, saponite, hectorite; and also from other clays such as kaolinite, vermiculite and sepiolite, or one of their synthetic or naturally interstratified mixtures.

The organic matrix can be a polymer, oligomer, or monomer, preferably a polymer. It may be a particle that can be transformed when molten or in the liquid state. As an example, the following can be used: polyethylene, polypropylene, and their copolymers, halogenated and non-halogenated elastomers, thermoplastic elastomers, silicones, or a mixture of such polymers, preferably polyethylene. Ethylene copolymers that can be selected include ethylene-vinyl acetate copolymers, ethylene-propylene copolymers, ethylene-alkyl acrylate copolymers, ethylene-acrylic acid copolymers, ethylene terpolymers, or said polymers containing specific groups (acids, epoxy groups, . . . ).

Polymers that can be used in the liquid state include polymers selected from polyester resins, epoxy resins, polyamides, polyimides, polyetherimides, polyamide imides, polyurethanes, or a mixture of said polymers.

The starting clay is treated with a solution of a salt of a metallic compound, preferably a solution of an iron and/or aluminum salt. After drying and heat treatment, a bridged clay is obtained.

The bridged clay can then undergo a specific treatment to render it more organophilic. To this end, it is treated with a surfactant solution, for example a quaternary ammonium salt.

The bridged clay is then mixed with the organic compound. Mixing is carried out in a flow mixer or batch mixer in the presence of 0.5% to 20% of treated clay and at a temperature in the range 80° C. to 250° C., more generally in the range 120° C. to 220° C., for a period in the range 2 minutes to 2 hours, more particularly in the range 4 minutes to 30 minutes. In the case of a polymer, the nanocomposite can be obtained, for example, by mixing with a molten polymer. This process is also known as melt intercalation. However, it is also possible to carry out in situ polymerization.

This process can produce nanocomposites with thermal properties that are improved over those of nanocomposites obtained using the conventional process.

More particularly, the invention provides a nanocomposite comprising clay and an organic compound, in which the clay is a clay bridged with a metal compound. The metal compound is preferably a metal oxide. It may comprise a proportion of another metal compound such as a metal hydroxide. Preferably, the clay is bridged by an iron and/or aluminum compound.

The nanocomposite preferably comprises a clay selected from montmorillonite, laponite, beidellite, nontronite, saponite, sauconite, hectorite, stevensite, kaolinite, halloysite, vermiculite, and sepiolite, or one of their synthetic or naturally interstratified mixtures. Laponite and montmorillonite are particularly preferred.

Preferably, the organic compound in the nanocomposite is a polymer. In one embodiment, the polymer is preferably selected from polyethylene, polypropylene, ethylene copolymers, non-halogenated elastomers, thermoplastic elastomers, silicones, or mixtures thereof. In a further embodiment, the polymer is selected from polyester resins, epoxy resins, polyamides, polyimides, polyetherimides, polyamide imides, polyurethanes, and mixtures thereof.

In one aspect of the invention, an advantageous application of these nanocomposites is cable insulation. The term "cable" means bundles of conductive wires or fiber optics protected by insulating sheaths used to supply electricity or in telecommunication networks. Preferably, the nanocomposites are used in insulating telecommunication cables and power cables.

The invention thus concerns a power cable the sheath of which comprises a nanocomposite of the invention. The invention also concerns a telecommunications cable the sheath of which comprises a nanocomposite. Preferably, the sheath is constituted by a nanocomposite. In a further embodiment, the cable is provided with an outer coating comprising a nanocomposite.

The invention also concerns a process for producing said nanocomposite, comprising the steps of preparing a clay bridged by a metal compound and mixing with an organic compound.

In one embodiment, preparing the bridged clay comprises the steps of adding a mixture of an oligomeric solution of a metal compound to the clay in suspension, eliminating the excess solution by centrifuging, washing the residue, drying, and heat treatment.

In one embodiment, the bridged clay is treated with a compatibilizing compound prior to mixing with the organic compound. Preferably, the compatibilizing compound is a quaternary ammonium salt.

BRIEF DESCRIPTION OF THE DRAWING

Further characteristics and advantages of the invention will become clear on reading the following description of embodiments of the invention, given by way of example only, and made with reference to the accompanying drawing in which:

FIG. 1 is a diagrammatic representation in cross section of a power cable in a first embodiment of the invention; and FIG. 2 is a diagrammatic representation in cross section of a power cable in a further embodiment of the invention.

MORE DETAILED DESCRIPTION

In one embodiment, the invention concerns a power cable 1 comprising a core 2 of conductive material surrounded by a sheath 3. The term "power cable" means any electrical conductor intended to transport electrical energy and comprising at least one sheath. Such a cable comprises a core of conductive material, in general surrounded by different layers including a sheath. This sheath preferably provides fire protection.

In accordance with the invention, sheath 3 is at least partially composed of a nanocomposite material based on bridged clay with a polymer inserted between the lamellae thereof. The fire resistance and resistance to water and solvents of the resulting insulated electrical wire are substantially improved.

In the embodiment shown in FIG. 2, sheath 3 comprises an outer protective coating in addition to the insulating material layer. The insulating sheath 3 or insulating coating 4 comprises a nanocomposite material based on the bridged clay of the invention.

The embodiment shown in FIG. 2 is typical of low voltage AC cables. Integrating this nanocomposite material into insulating material layer 4 and/or outer sheath (not shown) substantially improves the mechanical characteristics, strength and fire propagation behavior and substantially improves water and solvent impermeability.

EXAMPLES

EXAMPLE 1

LLDPE polyethylene (Escorene 1004, supplied by Exxon Chemicals) was milled for 15 minutes at 160° C. Plates were produced using a hot press (5 minutes at 160° C. at a pressure of 100 bars). Samples were cut from the plates to study the mechanical and thermal properties and to observe the fire behavior of these materials.

EXAMPLE 2

100 grams (g) of Escorene 1004 polyethylene was introduced into a kneader at a temperature of 160° C. at a shear rate of 15 revolutions per minute (rpm). After 2 minutes, 10 g of untreated laponite (provided by Laporte Ind., Ltd), a synthetic trioctahedral clay, was introduced then mixed at 30 rpm for 15 minutes. Plates were produced using a hot press (5 minutes at 160° C. at a pressure of 100 bars). Samples were cut from the plates to study the mechanical and thermal properties and to observe the fire behavior of these materials.

EXAMPLE 3

100 g of laponite was stirred in 5 liters (l) of water for 30 minutes to produce a good dispersion. A solution of iron chloride and/or aluminum chloride was added dropwise to a base (sodium carbonate and/or a solid sodium hydroxide solution respectively) to obtain a base/metal ratio of 2 to 2.4. The oligomeric solutions obtained were allowed to stand for a period of 1 to 7 days. These aged Al/Fe solutions were added, with stirring, to the previously prepared clay suspension. The excess oligomeric solution was eliminated by centrifuging, then the residue was washed with distilled water until the chlorides had been eliminated. The product obtained was either dried at ambient temperature or at a slightly elevated temperature of 60° C., or freeze-dried. The dry product was then heated for 3 hours at 300° C. to produce a bridged clay. The nanocomposite was prepared by introducing 100 g of Escorene 1004 polyethylene into the mixer and 10 g of laponite bridged under the conditions described in Example 2.

EXAMPLE 4

100 g of laponite was stirred in 5 l of water for 30 minutes to produce a good dispersion. A 0.01 M quaternary ammonium solution (hexadecyl trimethyl ammonium bromide) was slowly added, with stirring, to the previously prepared clay suspension, until a maximum quantity was reached corresponding to the cation exchange capacity of the clay (~1 equivalent/g), at ambient temperature. The organic suspension was washed with distilled water and the excess surfactant was eliminated by vacuum filtering until the anions had been eliminated. The product obtained was either dried at ambient temperature or freeze dried, to produce an organophilic clay. The nanocomposite was prepared by introducing 100 g of Escorene 1004 polyethylene into the mixer with 10 g of organophilic laponite under the conditions described in Example 2.

EXAMPLE 5

100 g of laponite was stirred in 5 l of water for 30 minutes to produce a good dispersion. The bridged laponite obtained under the conditions described in Example 3 was then treated with a 0.01 M quaternary ammonium solution under the conditions described for Example 4. The organophilic bridged product obtained by this double treatment was either dried or freeze dried. 10 g of organophilic bridged laponite was used to prepare the nanocomposite with 100 g of Escorene 1004 polyethylene under the conditions already described for Examples 2 or 3.

EXAMPLES 6 TO 8

Examples 3 to 5 were repeated using montmorillonite instead of laponite.

Examples 1, 2 and 4, also 5, 6 and 8 were examples carried out for comparison purposes to demonstrate the effect of bridging and of the organophilic clay formation treatment.

The mechanical properties of the nanocomposites obtained in Examples 2 to 8 were then tested. By way of comparison, the same measurements were carried out on pure LLDPE 1004 polyethylene (Example 1). The results are shown in Table 1 below.

It can be seen that the break strength Ts and elongation at break Eb were lower for all of the nanocomposites compared with pure polyethylene. In contrast, the Young's modulus was considerably higher. It should also be noted that the properties of the nanocomposites of Example 5 were improved; this nanocomposite had undergone a supplemental treatment step using quaternary ammonium. Comparison with montmorillonite produced a result of the same order. The nanocomposite of Example 7, treated only with quaternary ammonium salt, had a Young's modulus that was only slightly higher than the pure polymer. In contrast, the nanocomposite with the best values for the Young's modulus was that of Example 6, not treated with a quaternary ammonium salt. The montmorillonite that had undergone a double organophilic bridging treatment (Example 8) produced the best results.

TABLE 1

Mechanical properties of nanocomposites

| Example | Ts (MPa) | Eb (%) | Young's modulus (N/m) |
|---|---|---|---|
| 1 | 23 | 866 | 205 |
| 2 | 14 | 668 | 232 |
| 3 | 15 | 689 | 243 |
| 4 | 14 | 643 | 185 |

TABLE 1-continued

Mechanical properties of nanocomposites

| Example | Ts (MPa) | Eb (%) | Young's modulus (N/m) |
|---|---|---|---|
| 5 | 17 | 734 | 303 |
| 6 | 15 | 687 | 312 |
| 7 | 15 | 671 | 236 |
| 8 | 17 | 703 | 296 |

It has thus been shown that bridged clays save one step in the nanocomposite preparation process.

The thermal properties of the nanocomposites of Examples 3 and 5 to 8 and, for comparison, Example 1, were also evaluated. The results are shown in Table 2 below.

The presence of a small quantity of bridged filler produced a large variation in the polymer degradation temperature. Further, it could be seen that this displacement towards higher temperatures was the same for the composite treated by bridging, whether or not it had been rendered organophilic. The thermal degradation temperature was particularly increased for bridged clays that had undergone organophilic treatment.

TABLE 2

Thermal properties of nanocomposites

| Example | $T_{5\%}$ (° C.) | $T_{25\%}$ (° C.) | $T_{50\%}$ (° C.) | $T_{75\%}$ (° C.) | E ($\mu$Vs/mg) |
|---|---|---|---|---|---|
| 1 | 357 | 426 | 438 | 442 | −19442 |
| 3 | 332 | 426 | 460 | 478 | −16566 |
| 5 | 339 | 424 | 439 | 464 | −15379 |
| 6 | 332 | 434 | 457 | 472 | — |
| 7 | 349 | 414 | 454 | 476 | — |
| 8 | 348 | 439 | 472 | 482 | −11828 |

The fire behavior test showed that introducing a small quantity of filler could also limit the flow properties of products exposed to fire and also appeared to modify the degradation kinetics of the polymers, encouraging blackening. These results appear to be linked to diffusion of the polyethylene into the clay mesopores and to good dispersion of the clay.

Clearly, the invention is not limited to the embodiments described and shown, but a variety of modifications can be made by the skilled person without departing from the scope of the invention. In particular, the cable structure may be that of any known cable, and the disposition of the nanocomposite materials in the cable can be envisaged at any location where an insulating layer or protective sheath is to be found.

What is claimed is:

1. A nanocomposite comprising clay and an organic compound, in which the clay is a clay bridged with a metal compound in order to facilitate intercalation of the organic compound.

2. A nanocomposite according to claim 1, in which the metal compound includes at least one of iron and aluminum.

3. A nanocomposite according to claim 1, in which the clay of the nanocomposite is selected from the group consisting of montmorillonite, laponite, beidellite, nontronite, saponite, sauconite, hectorite, stevensite, kaolinite, halloysite, vermiculite, and sepiolite, or one of their synthetic or naturally interstratified mixtures.

4. A nanocomposite according to claim 1, in which the clay of the nanocomposite is laponite or montmorillonite.

5. A nanocomposite according to claim 1, in which the organic compound is a polymer.

6. A nanocomposite according to claim 5, in which the polymer is selected from the group consisting of polyethylene, polypropylene, ethylene copolymers, non-halogenated elastomers, thermoplastic elastomers, silicones, or mixtures thereof.

7. A nanocomposite according to claim 5, in which the polymer is selected from the group consisting of polyester resins, epoxy resins, polyamides, polyimides, polyetherimides, polyamide imides, polyurethanes, or mixtures thereof.

8. A power cable having a sheath which includes the nanocomposite according to claim 1.

9. A cable according to claim 8, in which the sheath consists of a single layer constituted by a nanocomposite.

10. A cable according to claim 8, wherein said sheath includes a layer of insulating material provided with an outer coating that comprises a nanocomposite.

11. A telecommunication cable having a sheath which includes the nanocomposite according to claim 1.

* * * * *